United States Patent [19]

Stumpe

[11] 4,170,387
[45] Oct. 9, 1979

[54] AUTOMATIC LOAD DEPENDENT BRAKE FORCE CONTROLLER

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 848,635

[22] Filed: Nov. 4, 1977

[30] Foreign Application Priority Data

Dec. 8, 1976 [DE] Fed. Rep. of Germany ....... 2655546

[51] Int. Cl.$^2$ .............................................. B60T 8/20
[52] U.S. Cl. ................................ 303/22 R; 303/23 R
[58] Field of Search .................... 303/22 R, 23 R, 6 C; 188/349, 195

[56] References Cited

FOREIGN PATENT DOCUMENTS

| | | |
|---|---|---|
| 1942609 | 3/1971 | Fed. Rep. of Germany ........ 303/22 R |
| 2435779 | 5/1976 | Fed. Rep. of Germany ........ 303/22 R |

Primary Examiner—Reinhard J. Eisenzopf
Attorney, Agent, or Firm—Edwin E. Greigg

[57] ABSTRACT

A load-dependent brake force controller including a lever mechanism with a variable fulcrum and a control mechanism which is arranged to bring the brake force controller into a middle position upon failure of the connecting linkage which includes a two-part shaft, one driving shaft part fixedly attached to a lever moved by the vehicle axle and indirectly coupled via an excursion limiter embodied as a torque coupling to a sled for varying the support point of the fulcrum with the other shaft fixedly coupled to the sled, wherein the control mechanism is disposed in the vicinity of the confronting ends of the two-part shaft and usually exerts a largely ineffective torque on the driving shaft part but, upon a fracture or failure of the driving linkage, acts on the second shaft part with a torque that is greater than the torque exerted by the excursion limiter.

7 Claims, 4 Drawing Figures

AUTOMATIC LOAD DEPENDENT BRAKE FORCE CONTROLLER

BACKGROUND OF THE INVENTION

The invention relates to brake force controllers. More particularly, the invention relates to a brake force modulator or controller in which there are disposed two hydraulic pistons that are coupled by a lever which is supported on a fulcrum mechanism. The relative position of this fulcrum mechanism is subject to adjustment. The two hydraulic pistons are exposed, respectively, to the brake pressure upstream and downstream of the brake force controller. The load carried by the vehicle is sensed as relative motion of an axle and this motion is transmitted by suitable linkage to the fulcrum mechanism to change its position. In case of malfunction of the linkage, the controller seeks an average, center adjustment. A brake force controller of this type is known from the German Offenlegungsschrift No. 2,435,779. In this known construction, when the automatic control fails, a compromise is made between a "full-load" setting and a "no-load" setting independent of the actual load condition, and the brake force controller then assumes a "middle" setting. Excessive braking of the vehicle due to failure of the linkage is thereby positively prevented.

However, the known brake force controller has the disadvantage that, when the relatively heavy linkage actually breaks, the controller shaft tends to be rotated toward an extreme setting. Such a setting of the controller can result in excessive or insufficient braking of the vehicle.

OBJECT AND SUMMARY OF THE INVENTION

It is therefore a principal object of the present invention to provide a brake force controller of the general type described above but with the added advantage that the control mechanism is held in a non-effective standby position by means of the driving shaft part so long as the actuating linkage is intact. However, when the linkage connecting the vehicle axle to the controller breaks, then the brake force controller is brought into a "failure" attitude corresponding to a semi-loaded position.

Another object of the invention is to provide a brake force controller in which the "failure" attitude coincides with an extreme setting of the driving shaft part; therefore, the broken linkage cannot twist the driving shaft part.

Yet another object is to insure that the driving shaft part is rotated in the same direction when it traverses the settings "loaded", "half-loaded", "empty", and "failure", as when it is twisted by a broken linkage.

The invention will be better understood we well as further objects and advantages thereof become more apparent from the ensuing detailed description of a preferred exemplary embodiment taken in conjunction with the drawing.

DESCRIPTION OF THE PREFERRED EMBODIMENT

Figure 1:
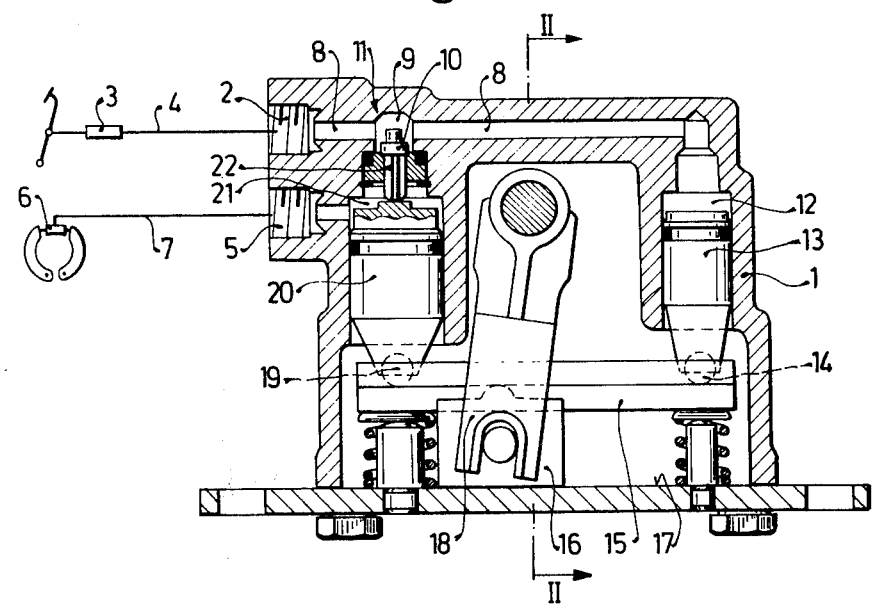
FIG. 1 is a sectional view of the brake force controller according to the invention.

Turning now to FIG. 1, there is shown a brake force controller including a housing 1 that is provided with a fitting 2 for a line 4 which extends from a master cylinder 3. A fitting 5 couples a line 7 to the wheel cylinders 6. The lines 4 and 7 thus form the brake line 4/7.

A duct 8 extends from the fitting 2 through a valve chamber 9 which contains a closure body 10 of a control valve 11. The duct 8 terminates in a chamber 12 that is bounded by the surface of a piston 13. The dependent portion 14 of the piston member 13 is arranged in pressure exerting contact with one end of a rocker lever 15 that swivels about an adjustable support point or fulcrum. The support point is formed by a reciprocable sled 16 which is arranged to glide along a lower surface 17 in the housing 1 whenever such motion is imparted to the sled 16 by means of a bifurcated member 18. The other end of the rocker 15 is arranged to exert pressure on an end 19 of a piston member 20, the surface of which bounds a chamber 21 that communicates with the fitting 5.

The valve 11 controls the interconnection of the valve chamber 9 and the chamber 21 and its closure body 10 is provided with a push rod 22 that is reciprocable by means of the piston member 20.

Figure 2:
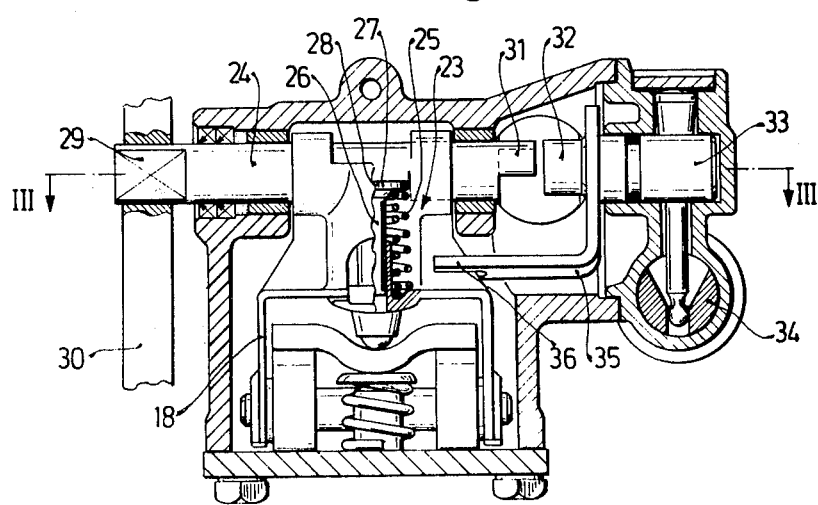
FIG. 2 is a section along the line II—II in FIG. 1.

The bifurcated member 18 is coupled, as can be seen from FIG. 2, by means of an excursion limiter or regulator means 23 to the driving part 24 of a two-part axially aligned shaft having parts 24 and 33. The excursion limiter 23 comprises essentially a push rod 26 that is subjected to the force of a spring 25 while the head 27 of the push rod 26 is pressed against a flattened portion 28 of the driving shaft 24. An end portion 29 of the driving shaft 24 is arranged to project out of the housing 1. A lever 30 that is associated by linkage means (not shown) to the vehicle axle, is attached to this end portion 29 of the partial shaft 24.

The end 31 of the driving shaft 24 is milled to provide a flat area and this flat area is arranged to lie opposite a likewise milled end 32 of the other partial shaft 33. The two partial shafts 24 and 33 are oriented coaxially. The partial shaft 33 is coupled to a motion damper 34 (FIG. 2). The partial shaft 33 additionally carries an angular element 35, the free arm 36 of which is arranged to grasp the bifurcated member 18 by means of its two prongs. The motion damper 34 isolates impacts, shocks, etc. from the sled 16 and includes a post arranged to pivot as the partial shaft 33 rotates, frictional engagement between the post and a squeezing member acting to resist shock loads on the sled 16.

Figure 3:
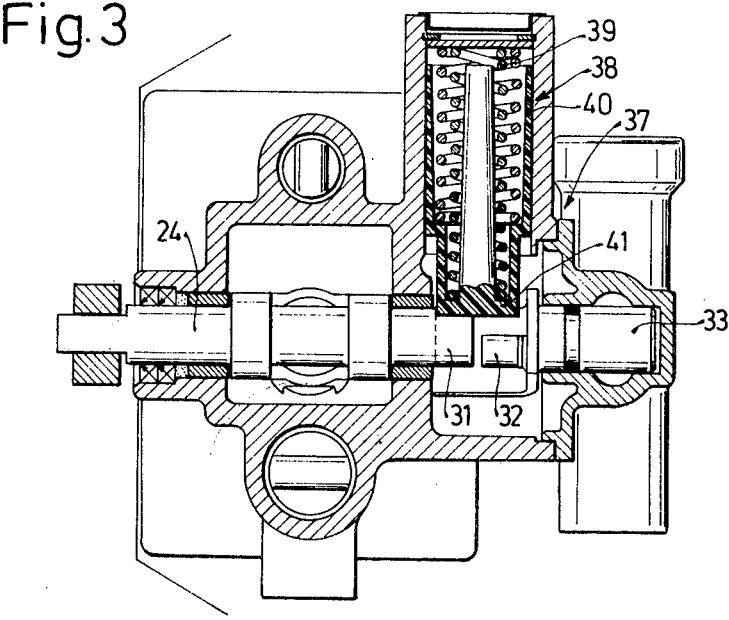
FIG. 3 is a section along the line III—III in FIG. 2.

As shown by FIG. 3, a control mechanism 37 is arranged to cooperate with the flattened areas provided on the partial shafts 24 and 33. The control mechanism 37 comprises on the one hand, the two flat-milled shaft ends 31 and 32 and, on the other hand, a spring capsule 38 that stands opposite or perpendicular to the shaft ends 31 and 32. The capsule 38 includes concentrically disposed springs 39 and an encompassing sleeve 40 the base 41 of which is intended to cooperate with the ends 31 and 32 of the partial shafts 24 and 33, respectively.

The spring 25 of the excursion limiter 23 and the concentric springs 39 of the control mechanism 37 are so dimensioned that the torque produced by the control mechanism 37 is the greater of the two torques exerted upon the partial shaft 24.

METHOD OF OPERATION

When the control linkage (not shown) is intact, the brake force controller functions as follows:

The control valve 11 is normally open. When the brakes are actuated and the piston members 13 and 20 begin to receive pressure, the brake force controller begins its control function, i.e., the control valve 11 is rapidly and alternately pushed open and closed by means of the rocker 15 while the brake pressure is rising. According to the position of the sled 16 which supports the rocker 15, different lever ratios become effective in the brake force controller when the sled 16 is positioned in accordance with the varying distance of the vehicle axle from the vehicle body.

The excursion limiter 23 serves to ensure that excessively large excursions cannot be imparted to the sled 16, while the motion damper 34 prevents too rapid a displacement of the sled 16. In both instances, the spring 25 in the excursion limiter 23 is compressed, so that the driving shaft 24 may rotate farther and faster than the fork 18.

Figure 4:
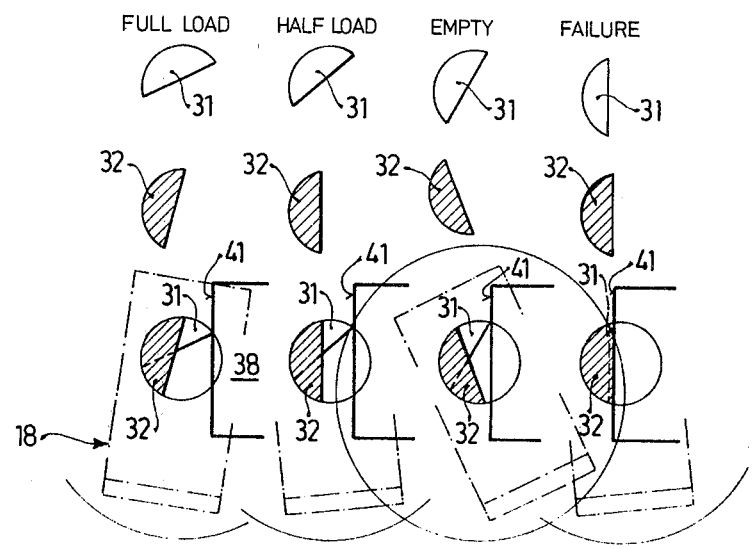
FIG. 4 is a schematic view of possible settings of the control mechanism.

FIG. 4 shows the milled ends of shafts 31 and 32 schematically in four different attitudes; for the sake of clarity the end 32 of the partial shaft part 33 is cross-hatched. In addition to showing the ends of shafts 31 and 32, the base surface 41 of the spring capsule 38 which contains the concentric springs 39 is also shown. Viewing from left to right, there are shown varying views of the end of the shafts 31 and 32 and therebeneath a composite view of the shafts, the bifurcated member 18 and the spring capsule 38. This composite view is believed requisite for a better understanding of the given directions of rotation. The four different settings or attitudes are from left to right:

1. the "full-load attitude" (lever ratio 1:1),
2. the "half-load attitude" (lever ratio 1:2),
3. the "no-load attitude" (lever ratio 1:6), and
4. the "failure attitude" (lever ratio 1:2).

The "lever ratio" referred to above relates to the ratio of the lengths of the arms of the rocker lever 15 which lie respectively on opposite sides of the fulcrum on the slide 16.

It is to be understood that in the "fully-loaded attitude" the spring capsule 38 is raised by the driving shaft 24, but it remains ineffective in moving the shaft because the torque imparted by the vehicle body is substantially greater than the counter torque created by the spring capsule element 38. The same holds true for the settings "half-load" and "no-load". The shaft-end 32 that is shown cross-hatched is constructed to rotate by the bracket 35 to follow the displacements of the sled 16, and is so oriented that, in the half-load setting, the flat surface of the shaft end 32 lies parallel to the base surface 41 (see FIG. 3) whereas, in the "no-load" setting, the shaft-end 32 is rotated beyond this position. In the event of a fracture and separation of the linkage between the vehicle axle and the driving shaft 24, it will most probably fall, and hang down from the controller, thereby exerting some remaining torque on the shaft 24. This remaining but diminished torque tends to rotate the shaft 24 in the direction of "no-load" and beyond until the flattened part of the end 31 is vertical (failure mode, FIG. 4).

It will be recalled that the concentrically arranged springs 39 in the control mechanism 37 are stronger than the spring in the excursion limiter 23. Thus, this fact permits the base 41 to rotate the flattened end 32 of the driven shaft 33 (FIG. 3) back into the parallel position so that the bracket 35 returns the sled 16 to the "half-load" position (lever ratio 1:2). The relatively weak spring in the excursion limiter 23 permits this displacement regardless of the immobility of the shaft 24.

In view of the foregoing, it will be appreciated that upon a breakage of the linkage, the brake force controller is always brought into the "half-load" mode, thereby insuring effective braking.

The foregoing relates to preferred exemplary embodiments of the invention, it being understood that other embodiments and variants are possible within the spirit and scope of this invention, the latter being defined by the appended claims.

I claim:

1. A brake force controller for use in the braking system of a motor vehicle, said braking system including wheel brakes, a master cylinder and fluid conduits connecting said master cylinder and said wheel brakes; said brake force controller including a housing and two hydraulic cylinder-piston assemblies and a pressure control valve disposed downstream of said controller, the two pistons of said two cylinder-piston assemblies being coupled by a lever member which pivots on a fulcrum, said fulcrum being provided by a movable support, thereby providing changeable effective lever arms of said lever member for changing the effective relative torque exerted by said pistons, and further including a linkage for linking a motor vehicle axle to a yieldable member in said controller to thereby move said movable support, and wherein the improvement comprises:
   regulator means, disposed in said controller for exerting a rotary motion force;
   first and second shafts, connected to said linkage, and so disposed coaxially that said yieldable member exerts a torque on said first shaft which is less than the torque normally applied by said linkage when intact, thereby having no effect on the displacement of said first shaft, and when said linkage is broken, said yieldable member exerts a torque on said second shaft which is greater than the maximum torque sustainable by said regulator means, and when the first shaft is further rotated when the linkage breaks, said yieldable member readjusts the movable support in the direction of a medial position; and the movable support is a slide which is disposed to move in said housing and which is urged to so move by said first shaft via said yieldable member which is a torque-limiting rotary coupling, and wherein said second shaft is positively coupled to said slide.

2. A brake force controller as defined by claim 1, further comprising damper means connected to said second shaft, for damping the motion of said second shaft.

3. A brake force controller as defined by claim 1, wherein adjacent ends of said first and second shafts have flat circumferential portions and said regulator means includes a spring which exerts a force on said flat portions, thereby tending to rotate said shafts.

4. A brake force controller as defined by claim 3, wherein said regulator means further comprises a bushing surrounding said spring, said bushing having a bottom surface which cooperates with said flat portions of said first and second shafts.

5. A brake force controller as defined by claim 4, wherein the dimensions of said torque limiting coupling and said regulator means are so related that when said linkage is broken and fails to supply torque to said first shaft, said regulator means can rotate said second shaft by forcing said flat portion of said second shaft into parallelism with said bottom surface of said bushing while overcoming the torque limit of said rotary coupling, thereby placing said movable support in a definite position.

6. A brake force controller as defined by claim 5, wherein said definite position is a position corresponding to the position which said slide would have occupied with the vehicle half-loaded and the linkage intact.

7. A brake force controller as defined by claim 1, wherein said first shaft is so coupled to said vehicle axle by said linkage that while said linkage transmits the conditions of "full-load", "half-load", "no-load" and "no connection", (breakage), in that order, said first shaft rotates in one and the same direction only through said conditions.

* * * * *